US011319467B2

(12) United States Patent
Rodriguez Alonso et al.

(10) Patent No.: US 11,319,467 B2
(45) Date of Patent: May 3, 2022

(54) SELF-HEALING MICROCAPSULES, PROCESS FOR THE PREPARATION THEREOF, POLYMERIC MATRIX AND COMPOSITE MATERIALS COMPRISING THE SAME

(71) Applicant: FUNDACIÓN TECNALIA RESEARCH & INNOVATION, San Sebastián (ES)

(72) Inventors: Raquel Rodriguez Alonso, San Sebastián (ES); Sonia Florez Fernandez, San Sebastián (ES)

(73) Assignee: FUNDACIÓN TECNALIA RESEARCH & INNOVATION, San Sebastián (ES)

( * ) Notice: Subject to any disclaimer, the term of this patent is extended or adjusted under 35 U.S.C. 154(b) by 392 days.

(21) Appl. No.: 16/468,096

(22) PCT Filed: Dec. 13, 2017

(86) PCT No.: PCT/EP2017/082704
§ 371 (c)(1),
(2) Date: Jun. 10, 2019

(87) PCT Pub. No.: WO2018/109046
PCT Pub. Date: Jun. 21, 2018

(65) Prior Publication Data
US 2019/0330499 A1 Oct. 31, 2019

(30) Foreign Application Priority Data

Dec. 13, 2016 (EP) .................... 16382598

(51) Int. Cl.
| B01J 13/18 | (2006.01) |
| B01J 13/14 | (2006.01) |
| C09J 11/08 | (2006.01) |
| B29C 73/22 | (2006.01) |
| C09J 163/00 | (2006.01) |

(52) U.S. Cl.
CPC ............ *C09J 11/08* (2013.01); *B01J 13/185* (2013.01); *B29C 73/22* (2013.01); *C09J 163/00* (2013.01); C08L 2207/53 (2013.01)

(58) Field of Classification Search
None
See application file for complete search history.

(56) References Cited

U.S. PATENT DOCUMENTS

| 6,375,872 B1 | 4/2002 | Chao |
| 2002/0111434 A1 | 8/2002 | White et al. |
| 2009/0036568 A1 | 2/2009 | Merle et al. |
| 2014/0178770 A1 | 6/2014 | Xu et al. |
| 2016/0346753 A1* | 12/2016 | Shukla ............... C08G 59/188 |
| 2018/0280913 A1* | 10/2018 | Kobilka ............... C11D 3/505 |

FOREIGN PATENT DOCUMENTS

| CN | 101062024 A | 10/2007 | |
| CN | 100382257 C | 4/2008 | |
| CN | 101203536 A | 6/2008 | |
| CN | 101629024 A | 1/2010 | |
| CN | 101659719 A | 3/2010 | |
| CN | 103694635 A | 4/2014 | |
| CN | 104624132 A * | 5/2015 | ............. B01J 13/14 |
| EP | 2098918 A2 | 9/2009 | |
| WO | 2004007608 A2 | 1/2004 | |

OTHER PUBLICATIONS

Machine translation of CN-104624132-A (no date).*
Dong Yu Zhu et al, "Thermo-molded self-healing thermoplastics containing multilayer microreactors", Journal of Materials Chemistry A: Materials for Energy and Sustainability,vol. 1, No. 24, Apr. 10, 2013 (Apr. 10, 2013), p. 7191, XP055362285.
International Search Report dated Feb. 15, 2018 re: Application No. PCT/EP2017/082704, pp. 1-4, citing: U.S. Pat. No. 6,375,872 B1, Zhu Dong Yu et al. "Preparation and characterization", Dong Yu Zhu et al. "Thermo-molded", WO 2004/007608 A2 and EP 2 098 918 A2.
Written Opinion dated Feb. 15, 2018 re: Application No. PCT/EP2017/082704, pp. 1-8, citing: U.S. Pat. No. 6,375,872 B1, Zhu Dong Yu et al. "Preparation and characterization", Dong Yu Zhu et al. "Thermo-molded", WO 2004/007608 A2 and EP 2 098 918 A2.
Zhu Dong Yu et al, "Preparation and characterization of multilayered microcapsule-like microreactor for self-healing polymers", Polymer,vol. 54, No. 16, Jun. 15, 2013 (Jun. 15, 2013), p. 4227-4236, XP028671965.

* cited by examiner

*Primary Examiner* — Michael J Feely
(74) *Attorney, Agent, or Firm* — Cantor Colburn LLP

(57) ABSTRACT

Self-healing mircrocapsules including: a) a polymeric shell; b) a healing-agent compartmentalized inside the polymeric shell; and c) a catalyst deposited on the surface of the polymeric shell; where the microcapsules are prepared by suspension polymerization, and the microcapsules may be present in a polymeric matrix and in composite materials that include such polymeric matrix.

9 Claims, 3 Drawing Sheets

SELF-HEALING MICROCAPSULES, PROCESS FOR THE PREPARATION THEREOF, POLYMERIC MATRIX AND COMPOSITE MATERIALS COMPRISING THE SAME

TECHNICAL FIELD

The present disclosure relates to self-healing microcapsules, a process for the preparation thereof, a polymeric matrix and composite materials comprising the same.

BACKGROUND

Self-healing polymers are a class of smart materials that have the capability to repair themselves when they are damaged without the need for detection or repair by manual intervention of any kind.

The use of microcapsules for compartmentalization of a healing agent was a key step towards the design of self-healing materials.

Microcapsules have been used in applications of crack healing because they can be engineered to be ruptured by a propagating crack and can repair those cracks at the micron scale before they propagate to produce more significant damage. Furthermore, because of their size, microcapsules can be easily added to and suspended in the polymeric matrix by stirring prior to use of the matrix in a specific application. Also, the size of the capsules, shell wall thickness, and chemistry can all be customized for various applications, thus rendering the use of microcapsules amenable to both existing and emerging materials and applications.

A successful method of self-repairing cracks that has the potential for significantly increasing the longevity of materials has been described, for example, in US2002/111434. This self-healing system includes a material containing, for example, solid particles of Grubbs catalyst and capsules containing liquid dicyclopentadiene (DCPD) embedded in an epoxy matrix. When a crack propagates through the material, it ruptures the microcapsules and releases DCPD into the crack plane. The DCPD then mixes with the Grubbs catalyst, undergoes Ring Opening Metathesis Polymerization (ROMP), and cures to provide structural continuity where the crack had been.

US2009/036568 A discloses a self-healing material comprising a matrix, wherein a set of micro-pockets and a set of microcapsules are uniformly distributed and embedded in the matrix; each micro-pocket of the set of micro-pockets contains a liquid healing-agent; each microcapsule of the second set of microcapsules comprising a liquid selected from the group consisting of an oil, a perfluorated solvent, a hydrophobic ionic liquid, and mixtures thereof, and a catalyst dissolved or dispersed in the liquid and allowing the polymerization of the healing agent; being understood that when a crack is made in the matrix, at least one micro-pocket of the set of micro-pockets and one microcapsule of the set of microcapsules are broken to release and mix their content in the crack and thereby allow the polymerization of the healing agent in situ into a solid polymer that is bonded to the matrix and fills the crack to repair it. Optionally, the healing-agent is contained in microcapsules and a corresponding catalyst for the healing-agent is embedded in the matrix.

CN10162024 A discloses a self-repairing fibre reinforced polymer matrix composite and a preparation method thereof. In the method, a double-capsule repairing system containing, respectively, epoxy resin pre-polymer and curing agent is evenly mixed into a resin matrix, then, the matrix curing agent and the catalyst are added to be evenly mixed, the obtained mixture is used for dipping fibre reinforcing material, and at last, the self-repairing fibre reinforced polymer matrix composite is obtained by solidifying and shaping. When the self-repairing composite of the disclosure generates cracks or fibre unsticking damage owing to heat, force, environment corrosion and the like during processing, storing and using process, cracks pass through a restorative capsule which cracks along with the matrix to release reacting substance and quickly polymerize, thus preventing crack from expanding, repairing crack damage, keeping the mechanical property of the composites and prolonging the service life thereof. The self-repairing composite prepared by the disclosure can automatically finish repairing cracks at the temperature of −50 to 250° C., and the repairing process totally needs no artificial intervention.

One problem of the above described self-healing systems is the non-uniform distribution of the catalyst or curing agent (agglomeration problem), which makes it more difficult for the healing agent to enter into contact with the catalyst or curing agent and allow the repair.

Thus, in spite of the variety of self-healing systems and chemistries, there is still a need for materials with improved self-healing efficiency.

SUMMARY BRIEF SUMMARY

The problem to be solved by the present disclosure is the provision of a self-healing system with improved healing efficiency.

The solution is based on that the present inventors have verified that by providing self-healing microcapsules comprising a liquid healing agent compartmentalized inside a polymeric shell of the microcapsule and a catalyst deposited on the surface of said polymeric shell significantly increases the healing efficiency of the polymeric matrix comprising said microcapsules.

Accordingly, the disclosure relates to a self-healing microcapsule comprising: a) a polymeric shell; b) a healing-agent compartmentalized inside the polymeric shell; and c) a catalyst deposited on the surface of the polymeric shell. Specifically, a first aspect of the disclosure relates to a self-healing microcapsule comprising: a) a polymeric shell; b) a healing-agent compartmentalized inside the polymeric shell; and c) a catalyst deposited on the surface of the polymeric shell, wherein the polymeric shell comprises a monovinyl monomer selected from one or more of the following: styrene, methyl styrene, ethylene, propylene, methyl acrylate, ethyl acrylate, butyl acrylate, cyclohexyl acrylate, methyl methacrylate, ethyl methacrylate, hydroxyethyl methacrylate, glycidyl methacrylate, acrylic acid or derivatives thereof, preferably the monovinyl monomer is methyl methacrylate; wherein the healing-agent is selected from epoxy polymer, diglycidyl ether of bisphenol A (DGEBA), diglycidyl ether of bisphenol F (DGEBF), polyglycidyl ether of phenol-formaldehyde novolac, polyglycidyl ether of o-cresol-formaldehyde novolac, N,N,N',N',-tetraglycidyl methylenedianiline, bisphenol-A novolac, triglycidyl ether of trisphenol-methane, triglycidyl p-aminophenol, 3,4-epoxycyclohexylmethyl-3,4-epoxycyclohexane carboxylate and mixtures thereof; wherein the catalyst is selected from $BF_3$, $ZnCl_2$, $SnCl_4$, $FeCl_3$, and $AlCl_3$; $BF_3OEt_2$; lanthanide triflates $Ln(OTf)_3$, wherein Ln=La, Ce, Pr, Nd, Sm, Eu, Gd, Tb, Dy, Ho, Er, Tm, Yb, Lu, and OTf=$CF_3SO_3$; pseudolanthanides Sc(III) and Y(III) triflates.

In a second aspect, the disclosure relates to a method for preparing the self-healing microcapsules according to the disclosure, said method comprising the following steps; a) dispersing the catalyst in an aqueous phase in the presence of a dispersant; b) dispersing one or more water-insoluble monomers, oil-soluble initiator(s), and the healing agent in a continuous oil phase; and c) polymerizing the aqueous phase and the oil phase to form the self-healing microcapsules, wherein the healing-agent is selected from epoxy polymer, diglycidyl ether of bisphenol A (DGEBA), diglycidyl ether of bisphenol F (DGEBF), polyglycidyl ether of phenol-formaldehyde novolac, polyglycidyl ether of o-cresol-formaldehyde novolac, N,N,N',N',-tetraglycidyl methylenedianiline, bisphenol-A novolac, triglycidyl ether of trisphenol-methane, triglycidyl p-aminophenol, 3,4-epoxycyclohexylmethyl-3,4-epoxycyclohexane carboxylate and mixtures thereof; wherein the catalyst is selected from $BF_3$, $ZnCl_2$, $SnCl_4$, $FeCl_3$, and $AlCl_3$; $BF_3OEt_2$; lanthanide triflates Ln(OTf)$_3$, wherein Ln=La, Ce, Pr, Nd, Sm, Eu, Gd, Tb, Dy, Ho, Er, Tm, Yb, Lu, and OTf=$CF_3SO_3$; pseudolanthanides Sc(III) and Y(III) triflates.

In a third aspect, the disclosure relates to a polymeric matrix comprising a plurality of self-healing microcapsules according to the disclosure.

In a fourth aspect, the disclosure relates to a composite material comprising the polymeric matrix according to the disclosure.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
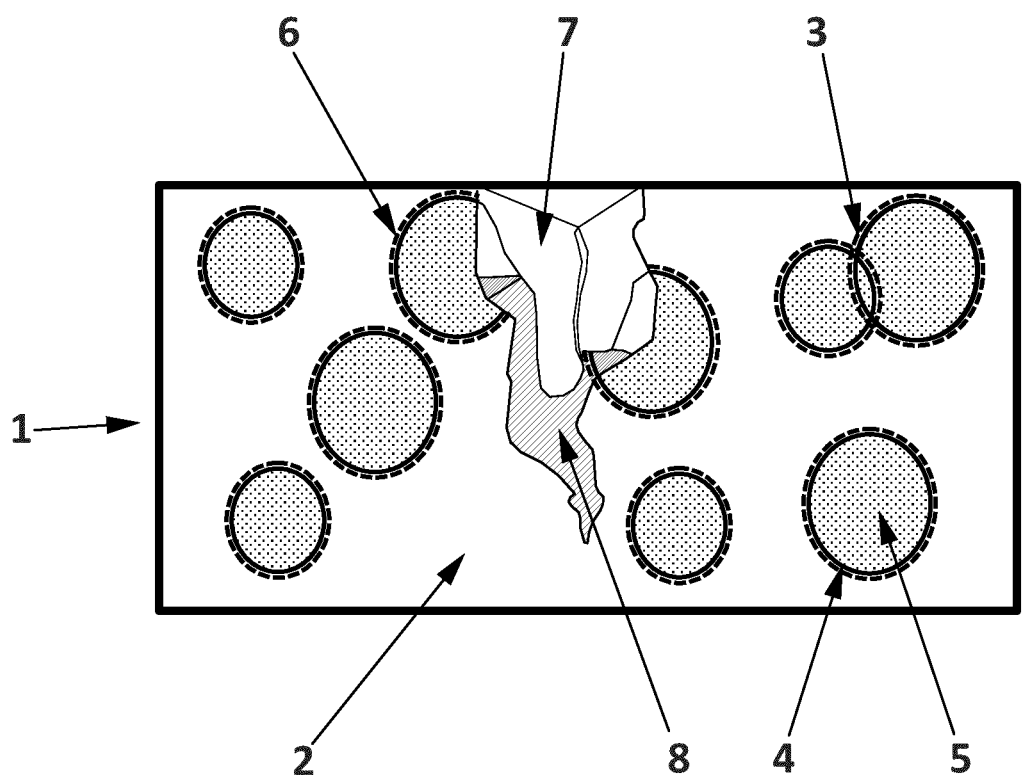
FIG. 1 is a schematic illustration of the self-healing system according to the disclosure.

FIG. 1 illustrates the self-healing system according to the disclosure. The composite material (1) comprises a polymeric matrix (2), in which is incorporated a plurality of self-healing microcapsules (3). The polymeric matrix (2) is a continuous phase in a material, where the continuous phase includes a polymer. The polymeric matrix (2) can be an epoxy resin, or other polymeric systems, such as for example polyurethanes or acrylates. The polymeric matrix (2) is usually used as the matrix for bonding the long continuous fibres in composite materials. The self-healing microcapsules (3) comprise a polymeric shell (4), a polymerizable healing agent (5) compartmentalized inside of the polymeric shell (4) and a catalyst (6) deposited on the surface of the polymeric shell (4). The polymeric shell (4) of the microcapsule (3) is designed to be sufficiently rigid so that it does not break easily and can comprise the healing agent (5) inside. At the same time, the polymeric shell (4) should be sufficiently adhered to the polymeric matrix (2) and easy to break, such that when a micro-crack (7) propagating across the polymeric matrix (2) ruptures the polymeric shell (4) realising the healing agent (5) comprised therein. Once released, the healing agent (5) enters into contact with the catalyst (6) located at the surface of the ruptured microcapsule (3). Through application of an external stimuli, e.g. heat, the healing agent is cured (8) and the micro-crack is repaired. The catalyst (6) corresponds to the polymerizable healing-agent (5), i.e. the corresponding catalyst (6) is capable of polymerizing the healing-agent (5). The healing-agent (5) comprises a polymerizable compound such as a monomer or prepolymer, and may optionally comprise other ingredients, such as other monomers and/or prepolymers, stabilizers, solvents, viscosity modifiers such as polymers, odorants, colorant and dyes, blowing agents, antioxidants, and co-catalysts. The healing-agent (5) is capable of being liquefied.

The polymeric shell (4) can be made of a variety of materials. According to a preferred embodiment of the disclosure, the polymeric shell (4) comprises a monovinyl monomer selected from one or more of the following: styrene, methyl styrene, ethylene, propylene, methyl acrylate, ethyl acrylate, butyl acrylate, cyclohexyl acrylate, methyl methacrylate, ethyl methacrylate, hydroxyethyl methacrylate, glycidyl methacrylate, acrylic acid or derivatives thereof. In a more preferred embodiment, the monovinyl monomer is methyl methacrylate, resulting in a self-healing microcapsule (3) with polymethyl methacrylate (PMMA) polymeric shell (4).

The selection of a healing-agent (5) depends upon many factors such as its chemical and physical properties, and compatibility with the other materials. For the optimal healing process, the healing-agent (5) from the broken microcapsule (3) should flow easily into the crack plane by capillary action, covering the maximum crack area to give a better strength to the damaged site. In other words, the healing agent (5) should have free flowing property, i.e. low viscosity in the matrix. In principle, according to the present disclosure, it is possible to use as healing-agent (5) any precursor insoluble in water, for example epoxy polymer, diglycidyl ether of bisphenol A (DGEBA), diglycidyl ether of bisphenol F (DGEBF), polyglycidyl ether of phenol-formaldehyde novolac, polyglycidyl ether of o-cresol-formaldehyde novolac, N,N,N',N',-tetraglycidyl methylenedianiline, bisphenol-A novolac, triglycidyl ether of trisphenol-methane, triglycidyl p-aminophenol, 3,4-epoxycyclohexylmethyl-3,4-epoxycyclohexane carboxylate, dicyclopendatiene (DCPD), siloxane,maleimide and mixtures thereof. In a preferred embodiment of the disclosure, the healing agent (5) is a diglycidyl ether of bisphenol A (DGEBA).

Examples of suitable catalysts (6) according to the disclosure include, but are not limited to: Lewis acids such as $BF_3$, $ZnCl_2$, $SnCl_4$, $FeCl_3$, and $AlCl_3$, that have been known as cationic polymerization catalysts; $BF_3OEt_2$; lanthanide triflates Ln(OTf)$_3$, wherein Ln=La, Ce, Pr, Nd, Sm, Eu, Gd, Tb, Dy, Ho, Er, Tm, Yb, Lu, and OTf=$CF_3SO_3$; pseudolanthanides Sc(III) and Y(III) triflates. In a preferred embodiment of the present disclosure, the catalyst (6) is scandium (III) triflate.

The self-healing microcapsules of the present disclosure are prepared by suspension polymerization. In a suspension polymerization, one or more water-insoluble monomers containing oil-soluble initiator(s) are dispersed in a continuous oil phase. The polymerization takes place within the oil droplets suspended in an aqueous phase. Thus, monomer droplets are converted into polymer particles. The size of the microcapsules can range from 10 μm to mm depending upon many factors like stirring speed, core material, shell material, position of agitator etc. The average diameter of the self-healing microcapsules of the present disclosure is 200 μm.

In general, monomer oil phase is formed by mixing a monovinyl monomer, the healing agent (5), a solvent and an initiator. The monovinyl monomer can be selected from one or more material of the following: styrene, methyl styrene, ethylene, propylene, methyl acrylate, ethyl acrylate, butyl acrylate, cyclohexyl acrylate, methyl methacrylate, ethyl methacrylate, hydroxyethyl methacrylate, glycidyl methacrylate, acrylic acid and derivatives thereof. In a preferred embodiment of the disclosure, the monovinyl monomer is methyl methacrylate.

The healing agent (5) is as describe above. The amount of the healing agent generally ranges from 10-40 wt % related to the polymeric shell.

In order to reduce viscosity of the healing agent (5) a water insoluble solvent compatible with the healing agent is incorporated into the oil phase. Suitable examples of such solvents include but are not limited to hydrocarbons, dodecane, hexadecane.

The initiator used is an oil-soluble initiator which can be selected from the following: 2,2-azobisisoheptonitrile, 2,2"-azoisobutyronitrile, 2,2"-azoibis-(2-methylbutyronitrile), dimethyl 2,2-azobis(2methyl propionate) and other azo initiators, benzoyl peroxide, dilauroyl peroxide, ter-butyl peroxy-2-ethylhexanoate, ter-butyl peroxy diethyl acetate or tert-butylperoxy isobutyrate, etc. The amount of the initiator generally ranges from 0.5-20 wt % of the monovinyl monomer.

To prepare the aqueous phase a dispersant is required. The suspension dispersant can be selected from barium sulfate, calcium sulfate, calcium phosphate, magnesium hydroxide, aluminium hydroxide, magnesium carbonate, calcium carbonate, aluminium oxide, titanium dioxide, polyvinyl alcohol, gelatine or methyl cellulose. The amount of suspension dispersant ranges from 0.1-20 wt % related to the polymeric shell. In a preferred embodiment, the amount of suspension dispersant is 4.0 wt % related to the polymeric shell.

The catalyst (6) is as described above and is also incorporated within the aqueous phase. Due to its nature, it self-assembles at the liquid-liquid interface.

Then, both phases are transferred to a polymerization reactor equipped with reflux condenser, stirrer, sampling device and nitrogen inlet. The reactor is heated to a predetermined temperature, preferably to 60-95° C., and more preferably to 70° C. The stirring speed ranges from 100-1000 rpm. The time of the polymerization is between 2-20 hours, preferably 4-15 hours, and more preferably 5-6 hours.

Subsequently, the thus obtained microcapsule suspension is filtered by filtration methods well-known in the art, such centrifugation filtration, vacuum filtration, pressure filtration and other filtration methods.

Finally, the obtained self-healing microcapsules are dried. In order to prevent the microcapsules from sticking to each during drying process, it includes a spray dryer, vacuum freeze dryer, vacuum dryer, etc.

The self-healing microcapsules according to the present disclosure can be incorporated into polymeric matrixes by processes that are well known to the skilled person in the art, such as for example manual mixture or mechanical mixture.

Composite materials comprising the polymeric matrixes with the self-healing microcapsules according to the disclosure incorporated therein are manufactured according to the well-known processes for manufacture of composite materials. Examples of such processes include manual lay-up, automated lay-up, spray-up, filament winding, pultrusion, resin transfer moulding.

EXAMPLES

Preparation of Self-Healing Microcapsules

Self-healing microcapsules comprising low viscosity diglycidyl ether of bisphenol A (DGEBA; DER™ 321 supplied by Dow Chemical Company) as healing agent, compartmentalized inside a PMMA polymeric shell and scandium (III) triflate catalyst (supplied by Sigma-Aldrich) deposited on the surface of the polymeric shell.

Figure 2:
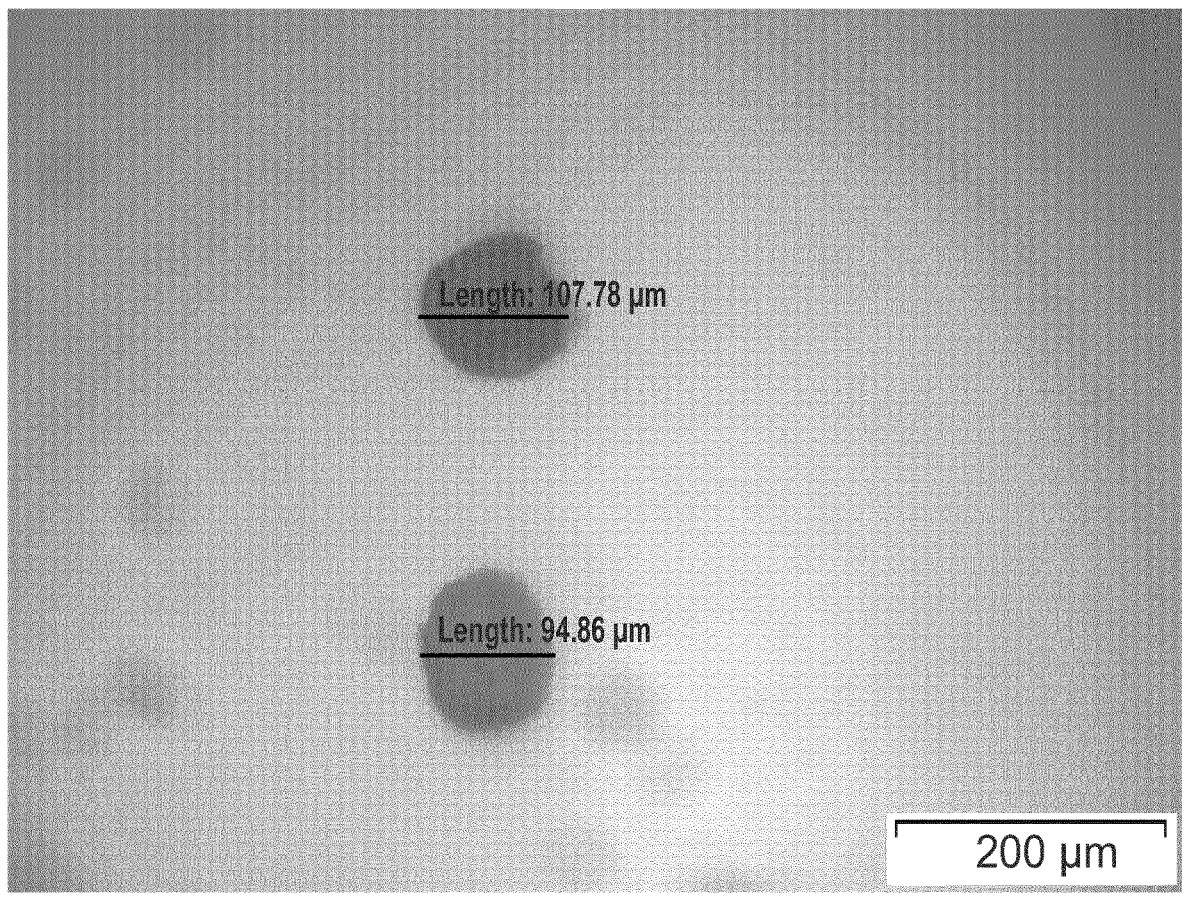
FIG. 2 is a photographic image obtained by optical microscopy (OM) of the self-healing microcapsules according to the disclosure.
Figure 3:
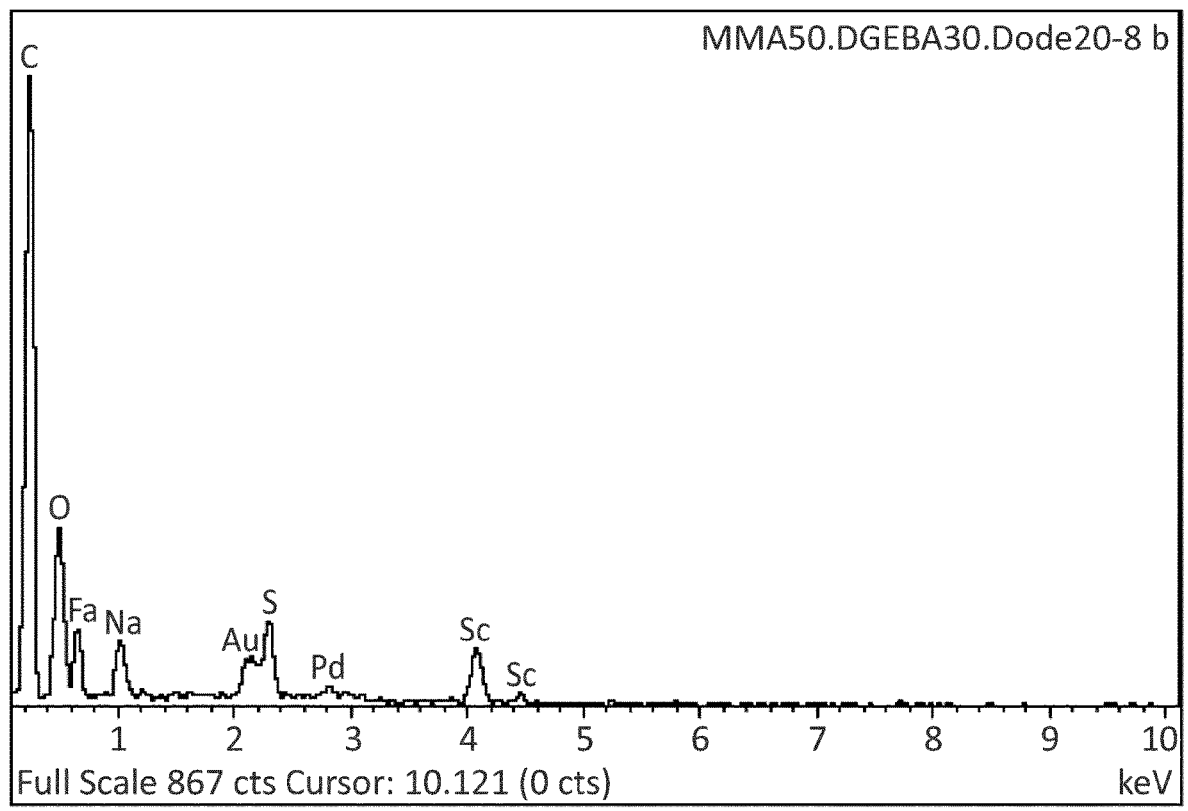
FIG. 3 is a Scanning Electron Microscopy (SEM) with Energy Dispersive X-ray Spectroscopy (EDS) of the chemical composition of a self-healing microcapsule according to one embodiment of the present disclosure.

275 g of aqueous phase is prepared by dissolving 1.35 g of polyvinyl alcohol (PVA) in deionized water until the mixing becomes homogeneous and clear. 3.78 g of Scandium (III) triflate are dissolved in the aqueous phase. The pH of the aqueous solution is adjusted to pH 7.0 with the help of a buffer solution. The oil phase is prepared by dissolving 9 g of DGEBA and 0.6 g of lauroyl peroxide in 6 g of dodecane and 15 g of methylmethacrylate (MMA). At room temperature the aqueous solution and the oil phase are poured into a 500 mL doubled jacket reactor. The nitrogen flow is speed at a flow rate of 12-15 mL/min. The speed of the stirrer is adjusted to 500 rpm. The thermostatic bath is heated up to 70° C. The solution is kept under continuous stirring during 5 hours at 70° C. Subsequently, the reaction is stopped by the incorporation of hydroquinone solution. A solution with microcapsules in suspension is obtained (see FIG. 2). This solution is then filtered and dried.

Testing the Microcapsules Self-Healing Efficiency

In order to analyse the microcapsules self-healing efficiency, the microcapsules were incorporated into a polymeric matrix (hysol 9483, bicomponent epoxy adhesive system). 20 wt % of microcapsules containing 30% of DGEBA and 20% of Dodecane were incorporated into the adhesive system part A and after getting a homogenous mixture part B was added. The lap shear strength was checked before and after applying healing cycles. The effect of incorporating the microcapsules in the specimens, as well as the healing efficiency were compared to a reference material.

The following describes in more detail the tests performed for determining the self-healing efficiency of the microcapsules according to the disclosure:

Two composite plates were adhesively bonded for an overlapping area of 12.5×25 mm². The thickness of the adhesive layer was approximately 2 mm, which was controlled by inserting short Teflon™ wires of the same diameter inside the bonded area. The length and amount of Teflon™ wires used did not affect the adhesive property. A 1 hour at 80° C. curing cycle was applied. Quasi-static tensile single lap-shear tests were performed on an Instron Universal machine with a 10 kN load cell at ambient conditions. All test specimens were located symmetrically in the grips; the long axis of the specimens coincided with the direction of the applied force through the centerline of the grip assembly. The load was applied at a constant rate of 1.3 mm/min and a typical load-displacement record of a tensile lap-shear test. The lap-shear strength was calculated by dividing the fracture load with the bonded area. At least 3-5 similar tests were conducted and the average result is reported for each individual group. Each specimen presented a broken bond. Both sides were joined and a healing cycle was applied, pressure was applied using clamps. The specimens were test again after the healing cycle under the same experimental conditions. Finally, a sample 6 (5 specimens)

with microcapsules (comprising 20 wt % of DGEBA) and 42 wt % of Scandium (III) triflate incorporated within the epoxy adhesive, was developed for comparison. These samples were tested under the same experimental conditions.

Six different samples were prepared and tested:

Sample 1: without self-healing microcapsules.

Sample 2 (according to the disclosure): with 20 wt % of microcapsules (30 wt % DGEBA and 42 wt % Scandium (III) triflate (ScT)—Healing cycle 24 hours at room temperature.

Sample 3 (according to the disclosure): with 20 wt % of microcapsules (30 wt % DGEBA and 42 wt % ScT)—Healing cycle 24 h at 120° C.

Sample 4 (according to the disclosure): with 20 wt % of microcapsules (30 wt % DGEBA and 42 wt % ScT)—Healing cycle 2 h at 75° C.

Sample 5 (according to the disclosure): with 20 wt % of microcapsules (30 wt % DGEBA and 42 wt % ScT)—Healing cycle 2 h at 120° C.

Sample 6 (comparative example): with 20 wt % microcapsules (30 wt % DGEBA)+42 wt % ScT incorporated in the polymeric matrix—Healing cycle 2 h at 120° C.

Results

The results of the above described tests are summarized in following table 1.

TABLE 1

Results for microcapsules self-healing efficiency.

| Sample | Adhesive system | Microcapsules % | Adhesive system Curing cycle | Resistance before healing (MPa) | Healing cycle | Resistance after healing (MPa) | Healing % | Average result (MPa) |
|---|---|---|---|---|---|---|---|---|
| 1.1 | Hysol | 0 | 1 h at 80° C. | 16.6 | 0 | N/A | N/A | N/A |
| 1.2 | 9483 | | | 14 | | | | |
| 2.1 | | 20 | | 12.9 | Room T | N/A | | |
| 2.2 | | | | 15.2 | | | | |
| 2.3 | | | | 12.6 | | | | |
| 3.1 | | 20 | | 11.2 | 24 h at | 5.3 | 47.3 | 42.5 |
| 3.2 | | | | 13 | 120° C. | 4.9 | 37.7 | |
| 3.3* | | | | 15 | | 2.5 | 16.7 | |
| 4.1* | | 20 | | 15.2 | 2 h at | 0.8 | 5.3 | 15.2 |
| 4.2 | | | | 10.9 | 75° C. | 1.5 | 13.8 | |
| 4.3* | | | | 12.7 | | | | |
| 4.4 | | | | 13.5 | | 2.1 | 15.6 | |
| 4.5* | | | | 11.7 | | | | |
| 4.6 | | | | 13 | | 2.1 | 16.2 | |
| 5.1 | | 20 | | 12.9 | 2 h at | 2.8 | 21.7 | 24.6 |
| 5.2 | | | | 7.9 | 120° C. | 1.8 | 22.8 | |
| 5.3 | | | | 10.2 | | 2.2 | 21.6 | |
| 5.4 | | | | 8.6 | | 2.2 | 25.6 | |
| 5.5 | | | | 11.7 | | 3.7 | 31.6 | |
| 6.1 | | 20 + ScT | | 13.2 | 2 h at | 0.7 | 5.3 | 3.1 |
| 6.2 | | matrix | | 11.9 | 120° C. | 0.3 | 2.7 | |
| 6.3 | | | | 12.3 | | 0.9 | 7.6 | |
| 6.4 | | | | 10.4 | | No repair | 0.0 | |
| 6.5 | | | | 12.0 | | No repair | 0.0 | |

*Samples that were not taken into account for the average due to experimental problems.

Discussion of the Results

As shown in table 1, healing efficiency of test samples according to the disclosure, (samples 2.1 to 5.5) increased with the temperature and duration of the healing cycle. In particular, for healing cycles with the same duration, the healing efficiency of test samples increased with the applied temperature (see samples 4.1 to 5.5).

Moreover, it can be observed that when compared to healing systems where the catalyst is incorporated into the matrix (sample 6.1 to 6.5), the healing system according to the disclosure (sample 5.1 to 5.5) has a significantly higher healing percentage and resistance after healing.

The invention claimed is:

1. A self-healing microcapsule comprising:
   a) a polymeric shell;
   b) a healing-agent encapsulated by the polymeric shell; and
   c) a catalyst deposited on the surface of the polymeric shell,
   wherein the polymeric shell is the polymerized product of one or more water-insoluble monovinyl monomers selected from: styrene, methyl styrene, ethylene, propylene, methyl acrylate, ethyl acrylate, butyl acrylate, cyclohexyl acrylate, methyl methacrylate, ethyl methacrylate, hydroxyethyl methacrylate, glycidyl methacrylate, acrylic acid and derivatives thereof;
   wherein the healing-agent is selected from epoxy polymer, diglycidyl ether of bisphenol A (DGEBA), diglycidyl ether of bisphenol F (DGEBF), polyglycidyl ether of phenol-formaldehyde novolac, polyglycidyl ether of o-cresol-formaldehyde novolac, N,N,N',N',-tetraglycidyl methylenedianiline, bisphenol-A novolac, triglycidyl ether of trisphenol-methane, triglycidyl p-aminophenol, 3,4-epoxycyclohexylmethyl-3,4-epoxycyclohexane carboxylate and mixtures thereof, and
   wherein the catalyst is selected from $BF_3$, $ZnCl_2$, $SnCl_4$, $FeCl_3$, and $AlCl_3$, $BF_3OEt_2$, lanthanide triflates $Ln(OTf)_3$, scandium (III) triflate, and yttrium (III) triflate, wherein Ln=La, Ce, Pr, Nd, Sm, Eu, Gd, Tb, Dy, Ho, Er, Tm, Yb, Lu, and OTf=$CF_3SO_3$.

2. The self-healing microcapsule according to claim 1, wherein the catalyst is scandium (III) triflate.

3. A method for preparing a self-healing microcapsule according to claim 1, wherein said method comprises the following steps:
   a) dispersing the catalyst and a dispersant in an aqueous phase;

b) dispersing the one or more water-insoluble monovinyl monomers, one or more oil-soluble initiators, and the healing agent in a continuous oil phase; and c) polymerizing the continuous oil phase in the presence of the aqueous phase to form the self-healing microcapsules.

4. The method according to claim 3, wherein the catalyst is scandium (III) triflate.

5. The method according to claim 3, wherein a water insoluble solvent compatible with the healing agent is also dispersed in the continuous oil phase.

6. The method according to claim 5, wherein the water insoluble solvent compatible with the healing agent is selected from hydrocarbons, dodecane, and hexadecane.

7. The method according to claim 3, wherein the polymerization occurs in a polymerization reactor at a temperature between 60 to 95° C. for 2-20 hours, and under a stirring speed of 100 to 1000 rpm.

8. A composition comprising a polymeric matrix and a plurality of self-healing microcapsules according to claim 1.

9. A composite material comprising the composition according to claim 8.

* * * * *